(12) United States Patent
Thompson

(10) Patent No.: US 10,328,531 B2
(45) Date of Patent: Jun. 25, 2019

(54) ROTARY DEVICE

(71) Applicant: ROLLS-ROYCE PLC, London (GB)

(72) Inventor: Ewan Fergus Thompson, Derby (GB)

(73) Assignee: ROLLS-ROYCE plc, London (GB)

( * ) Notice: Subject to any disclaimer, the term of this patent is extended or adjusted under 35 U.S.C. 154(b) by 658 days.

(21) Appl. No.: 14/877,476

(22) Filed: Oct. 7, 2015

(65) Prior Publication Data

US 2016/0123159 A1 May 5, 2016

(30) Foreign Application Priority Data

Oct. 31, 2014 (GB) .................................. 1419412

(51) Int. Cl.
F01D 5/28 (2006.01)
B23K 31/02 (2006.01)
F01D 5/14 (2006.01)
F04D 29/32 (2006.01)
F01D 11/12 (2006.01)
B32B 5/02 (2006.01)
B32B 7/04 (2019.01)
B32B 7/12 (2006.01)
(Continued)

(52) U.S. Cl.
CPC ............... *B23K 31/02* (2013.01); *B32B 3/04* (2013.01); *B32B 5/02* (2013.01); *B32B 5/024* (2013.01); *B32B 7/045* (2013.01); *B32B 7/12* (2013.01); *B32B 15/02* (2013.01); *B32B 15/14* (2013.01); *F01D 5/147* (2013.01); *F01D 11/12* (2013.01); *F04D 29/324* (2013.01); *B32B 2260/021* (2013.01); *B32B 2260/046* (2013.01); *B32B 2262/10* (2013.01); *B32B 2262/101* (2013.01); *B32B 2262/106* (2013.01); *B32B 2307/50* (2013.01); *B32B 2307/554* (2013.01); *B32B 2603/00* (2013.01); *F01D 5/282* (2013.01); *F04D 29/526* (2013.01); *F05D 2220/36* (2013.01); *F05D 2230/237* (2013.01); *F05D 2300/601* (2013.01)

(58) Field of Classification Search
None
See application file for complete search history.

(56) References Cited

U.S. PATENT DOCUMENTS 3,762,835 A 10/1973 Carlson et al.
5,356,701 A * 10/1994 Wei .................. B22F 3/002
442/6
(Continued)

FOREIGN PATENT DOCUMENTS

CN 103628923 A 3/2014
EP 0 575 685 A1 12/1993
(Continued)

OTHER PUBLICATIONS

Mar. 23, 2015 Search Report issued in British Patent Application No. GB1419412.0.
(Continued)

Primary Examiner — Kayla McCaffrey
(74) Attorney, Agent, or Firm — Oliff PLC

(57) ABSTRACT

A rotary device, comprises a central hub; and at least one blade extending from the hub; wherein the blade comprises a blade body and a blade cap, the blade body having a blade body tip, the blade cap being arranged to cover the blade body tip; and wherein the blade cap comprises a mesh.

19 Claims, 3 Drawing Sheets

(51) Int. Cl.
*B32B 15/02* (2006.01)
*B32B 15/14* (2006.01)
*B32B 3/04* (2006.01)
F04D 29/52 (2006.01)

(56) References Cited

U.S. PATENT DOCUMENTS

| | | | |
|---|---|---|---|
| 5,756,217 A * | 5/1998 | Schroder | F01D 5/20 428/148 |
| 5,951,254 A | 9/1999 | Sikorski et al. | |
| 6,221,795 B1 | 4/2001 | Sikorski et al. | |
| 6,251,526 B1 | 6/2001 | Staub | |
| 2007/0099011 A1 | 5/2007 | Wilson | |
| 2013/0186507 A1* | 7/2013 | Godon | B64C 11/26 139/425 R |

FOREIGN PATENT DOCUMENTS

| | | | |
|---|---|---|---|
| EP | 2 317 079 A2 | 5/2011 | |
| JP | 2003-214106 A | 7/2003 | |
| WO | WO 2013142988 A1 * | 10/2013 | B24D 3/06 |

OTHER PUBLICATIONS

Mar. 23, 2016 Search Report issued in European Patent Application No. 15 18 8704.

* cited by examiner

ROTARY DEVICE

The invention relates to a rotary device and a blade for a rotary device, in particular blades capable of rubbing on an abradable fan track liner.

Composite blades for rotary devices such as gas turbine engines have been developed, in particular to reduce blade weight as compared to metallic blades, for example.

It is desirable to run such gas turbine engines with the minimum gap between the blade tip and the casing which surrounds the blades. This minimises over-tip leakage and thus maximises aerodynamic performance.

For metallic blades, it can be acceptable for a metallic (for instance titanium) blade tip to rub against an abradable liner material on the surrounding duct. In that case, the gas turbine engine can be designed with very small gaps between the blade tip and duct, because the blades are strong enough to cope with any contact with the duct caused by e.g. a bird collision, thermal effects or mechanical vibrations. If a contact occurs, the abradable liner is scraped in a sacrificial manner by the blade, avoiding (or at least reducing) damage to the blade itself.

However, composite blades are less robust and resilient than their metallic counterparts, and have much lower wear resistances. As such, they are prone to damage and even delamination, which can be caused by over-heating in the event of a contact or rub with the surrounding duct.

Conventionally, this problem has been mitigated in different ways.

In some cases, gas turbine engines utilising composite blades are provided with a large tip clearance, to reduce risk of contact or rub. For example, some existing designs utilise non-rubbing blades of carbon/epoxy composite. These blades have no special features to protect the carbon/epoxy composite from damage, should a rub occur, and so run with a large gap between the blade tips and the fan track liner. However, this type of arrangement, with larger tip clearance, comes with an associated performance penalty for the engine as a whole.

Another option is to increase frequency of manual inspections, for example inspecting after every suspected rub, and repair or replace the blades as needed. As such replacements are typically required more frequently than for a metallic blade; this results in both increased maintenance costs and part costs.

Ways of more generally strengthening composite blades have also been considered.

The present invention aims to at least partially overcome the limitations discussed above.

According to a first aspect of the invention there is provided a rotary device, that can comprise: a central hub; and at least one blade extending from the hub; wherein the blade can comprise a blade body and a blade cap, the blade body can have a blade body tip, the blade cap can be arranged to cover the blade body tip; and wherein the blade cap can comprise a mesh. The provision of the mesh cap protects the blade tips from damage, whilst also improving the structural properties of the blade without adding excessive weight.

The mesh can be a metal wire mesh, optionally a steel wire mesh. A metal mesh may impart particularly desirable structural properties to the blade, whilst also being resilient to damage.

The blade cap can further comprise an abrasive grit. The abrasive grit can be disposed on the mesh, optionally only on the outer-most portion of the mesh. The abrasive grit can comprise or consist or substantially consist of one or more of cubic boron nitride, silicon carbide and alumina. The abrasive grit can have a mean grain size of 50 to 500 microns, optionally 100 to 300 microns, further optionally 150 to 250 microns. The use of a grit can provide the blade with an improved ability to cut, rather than rub, a surface which it unintentionally contacts. This is advantageous as it can result in less frictional heating of the blade and thus reduce damage brought about by heating, such as delamination in composite blades.

The mesh can be formed of lines having a diameter of 1.0 mm or less, optionally 0.5 mm or less, further optionally 0.3 mm or less. The mesh can have a mesh spacing of 2 mm or less, optionally 1 mm or less, further optionally 0.5 mm or less, and further optionally 0.3 mm or less. The mesh can be a square mesh or biased, and the lines of the mesh can be arranged on the surface of blade body to be at an optimal angle, typically approximately 45° (e.g. from 20° to 70°) to the aerofoil chord of the blade. The use of a fine mesh can reduce any negative impact of the mesh on the aerodynamic performance of the blade. By providing a mesh with lines at an optimal angle (typically around 45°) to the aerofoil chord, the mesh can drape well around the tip, and also provide compliance as the blade tip flexes.

The blade body tip can be the point on the blade body most radially distant from the hub. That is, the tip is the part of the blade that will first contact any surface provided around the blades, if the blades are urged towards such a surface (for example in the event of a bird-strike).

The blade body can comprise a composite material. Such materials can be easily damaged, and so providing the mesh cap can help the composite material avoid damage or reduce the amount of damage incurred by the composite material.

The rotary device can comprise a duct arranged around the hub and at least one blade. The duct can comprise an abradable liner disposed opposite the blade cap. When a duct is intentionally provided around the hub and blade, the chances of an accidental contact with the blade is increased, and the thus the mesh cap is particularly useful for reducing damage to the blade in such circumstances. The damage can be reduced further by the provision of a sacrificial liner within the duct, such that damage during a contact event is intentionally accrued to the liner rather than the blade.

The rotary device can be an engine, optionally a gas turbine engine.

According to another aspect of the invention, there is provided a blade for use in a rotary device, and the blade can comprise: a blade body, having a blade body tip; and a blade cap blade cap being arranged to cover the blade body tip; and wherein the blade cap can comprise a mesh. The blade can be provided with the features mentioned above in connection with the first aspect.

According to another aspect of the invention, there is provided a method of manufacturing a blade for a rotary device, and the method can comprise: shaping a mesh around a blade body tip to form a blade cap covering the blade body tip. The method can further comprise shaping the mesh by cold pressing, and/or attaching an abrasive grit to the mesh by brazing.

According to another aspect of the invention, there is provided a method of suppressing delamination of a composite blade for a rotary device, and the method can comprise: providing a mesh around a composite blade body tip to form a blade cap covering the composite blade body tip.

The invention is discussed below, by way of non-limiting example only, with reference to the accompanying Figures, in which.

Minimising blade tip clearance is a desirable feature to maximise fan blade performance, but this can result in rubbing between the blade tips and the surrounding duct. A tip cap solution can reinforce the composite blade to limit delamination during events such as bird-strike. The present disclosure identifies that any reasonably rigid cap or insert is potentially disadvantageous under these conditions, as it may then cause secondary damage (for example, by preventing a blade from flexing as it normally would, or by damaging other components, should it become detached). An alternative approach, as discussed below is to use a mesh cap.

Figure 1:
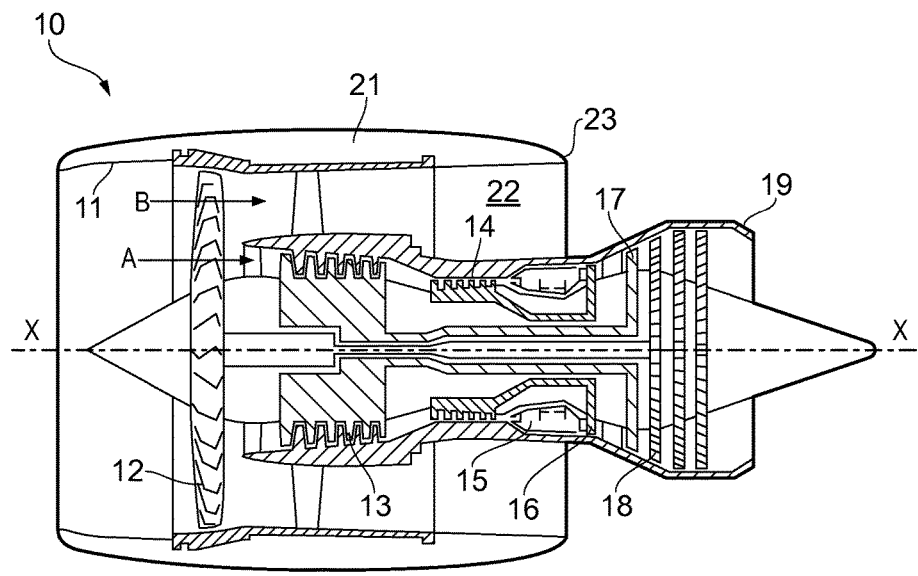
FIG. 1 is cross sectional view through a rotary device.

With reference to FIG. 1, a ducted fan gas turbine engine 10, which is an example of a rotary device, has a principal and rotational axis X-X. The engine 10 comprises, in axial flow series, an air intake 11, a propulsive fan 12, an intermediate pressure compressor 13, a high pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23. The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

Figure 2:
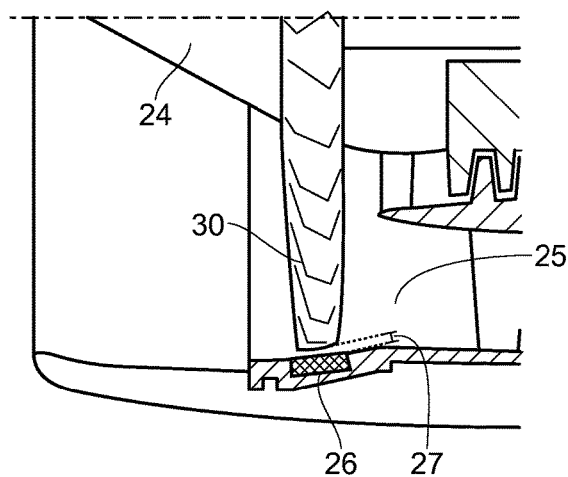
FIG. 2 is an expanded view of a section of the rotary device of FIG. 1.

FIG. 2 shows an expanded view of the lower left portion of FIG. 1, containing the propulsive fan 12. The central part of the propulsive fan 12 comprises a hub 24, from which the fan blades 30 project. The hub 24 is arranged on rotational axis X-X. The hub 24 is arranged centrally within the duct 25 of the rotary device 10. The blades 30 project radially from the hub 24 and, in use, rotate when the hub 24 rotates.

Figure 3:
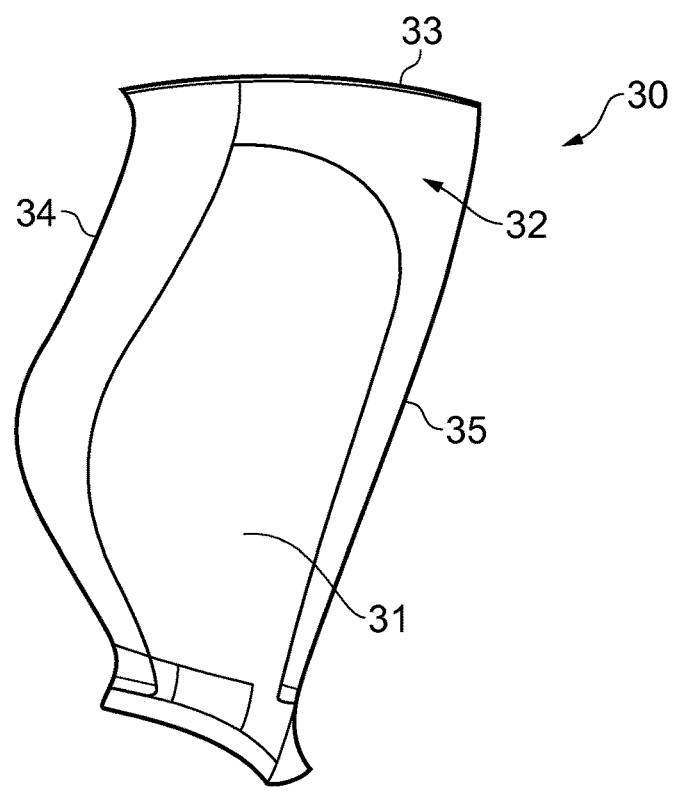
FIG. 3 is a drawing of a conventional composite blade.

FIG. 3 illustrates a typical composite fan blade 30. The blade 30 comprises a main blade body or substrate 31. Body 31 is made of a composite material, such as a polymer matrix composite (PMC). A common example of such a composite is a carbon/epoxy composite, but other composites can be used glass, Kevlar or boron fibres and other thermoplastic resins (e.g. BMI bismaleimide) or thermoplastics resins such as PEEK. The leading edge 34 and trailing edge 35 of the blade can be provided with metalwork, as can the pressure surface (the visible surface of the blade 30 in FIG. 3) and the suction surface (not visible in FIG. 3). Such metalwork 32 can provide the blade 30 with improved structural characteristics whilst maintaining the weight benefit of the composite materials used for the main blade body 31. For example, composite materials can be relatively brittle compared to metal and metal alloys, such as titanium. Therefore, providing metalwork 32 around the composite body 31 can provide some protection against brittle damage and failure modes.

Figure 4:
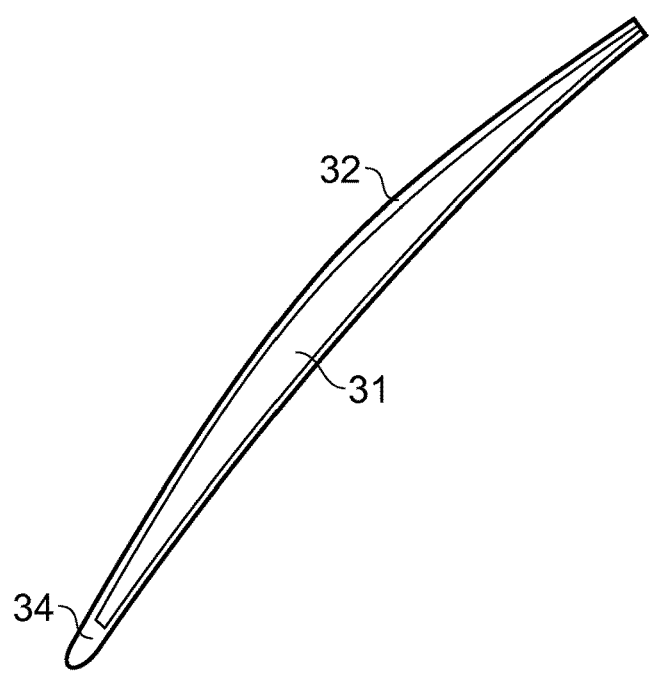
FIG. 4 is a view of the tip of the blade shown in FIG. 3.

Such metalwork 32 can extend to the blade tip 33. However, as illustrated in FIG. 4 (which is a view of the tip 33 of the blade 30 of FIG. 3 looking radially inwards) such metalwork 32 does not typically extend to cover the tip 33. That is, although, as illustrated, the metalwork may extend around the leading edge 34 of the blade 30, thus covering the leading edge 34, such metalwork 32 may not cover the tip 33 in the same way. The metalwork 32 may be titanium, for example, or any other suitable metal or metal alloy.

Returning to FIG. 2, the propulsive fan 12 is provided within the duct 25 of the gas turbine engine 10. The blades 30 of the propulsive fan 12 extend radially from the hub 24 towards the inner surface of the duct 25. The tip clearance 27 is the distance between the inner surface of the duct 25 and the blade tips 33. That is, the blade tip 33 is the point of the blade 30 that is radially most distant from the hub 24 and closest to the inner surface of the duct 25.

The inner surface of the duct 25 is provided with an abradable fan track liner 26. The liner 26 is disposed within the duct, opposite the blades 30 of the propulsive fan 12. In FIG. 2, the abradable liner 26 is shown being present only in the vicinity of fan 12. However, the liner 26 can extend further. The liner 26 can be at least as wide as the blades of the fan (in the direction X-X along the axis of the engine 10), and optionally can be somewhat wider, for example at least twice as wide, further optionally at least five times a wide.

As such, in the event of the blade 30 coming into contact with the inner surface of the duct, the blade tips 33 come into contact with the abradable liner 26. As a result, the liner 26 can be cut by the blade 30. The cutting mechanism limits rubbing between the blades 30 and the case and thus also limits frictional heating of the blade 30. However, for typical composite blades, this can still cause unacceptable damage to the blade 30.

Figure 5:
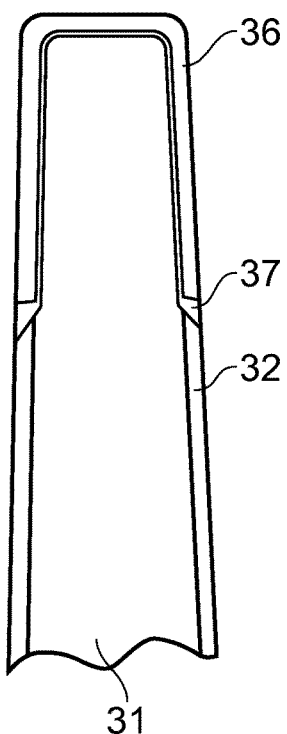
FIG. 5 is a cross sectional view, in the radial direction, of a blade tip provided with a mesh cap.

FIG. 5 shows the construction of a blade 30 with a protective mesh cap 36.

As for the blade 30 shown in FIGS. 3 and 4, the blade 30 comprises a blade body or substrate 31. In this example, the blade body 31 comprises a composite material. The main body 31 can be provided with additional edge and surface metalwork 32. In the example of FIG. 5, such metalwork 32 does not extend all the way to the tip 33 of the blade body 31. Instead, the blade (30) further comprises a blade cap 36 comprising a mesh. The tip 33 of the underlying blade body 31 is covered by the mesh. That is, the cap 36 is arranged to cover the tip 33. However, in other embodiments, the metalwork 32 may extend to the tip 33, and the mesh may be provided over the metalwork 32. The mesh forms the cap 36 that covers the blade tip 33.

The mesh of the cap 36 is constructed from intersecting lines of material. The lines may be bonded or woven together to form the resulting mesh. The geometry of the mesh is not particularly limited. As such, square or triangular meshes could be used, for example.

The diameter of the lines of the mesh can be 1.0 mm or less, optionally 0.5 mm or less, further optionally 0.3 mm or less. In a preferred embodiment, the diameter is in the region of 0.25 mm. Selection of a fine mesh will assist is achieving a smooth aerodynamic profile for the blade 30 as a whole, thereby maximising efficiency of the gas turbine engine 10.

The mesh spacing (i.e. the length of the line between intersections with other lines forming the mesh) can be 2 mm of less, optionally 1 mm or less, further optionally 0.5 mm or less, and further optionally 0.3 mm or less.

The mesh can be a wire mesh. That is, the mesh can be constructed from thin wires, woven together.

Preferably the material of the mesh is corrosion resistant. As such, stainless steel can be a suitable material for the mesh, but other materials (including other metals) can be used.

The mesh cap 36 is attached to the underlying blade 30. In FIG. 5, the mesh cap 36 is attached to the blade tip 33 using a suitable adhesive 37. Examples of such adhesives include epoxy resins, phenolic resins and thermoplastics. However, other methods of attachments are possible, depending on the underlying substrate of 31 the blade 30 and the metalwork 32. Such methods include welding or brazing, for example.

Forming the cap 36 from a mesh, as opposed to a solid material, is beneficial because it avoids the cap 36 from becoming overly stiff. This is useful when considering the final blade 30, as it does not overly limit the flexibility of the blade 30 itself. However, in terms of manufacturing the cap 36, it also enables the cap to be formed relatively easily, for example by cold pressing using simple tools. The low stiffness of the cap 36 can thus match the composite blade tip 33 stiffness well, which in turn suppresses a tendency of the cap 36 to peal or shear away from the underlying blade body 31 during a rub or impact event, as well as suppressing any delamination that might otherwise be induced by frictional heating.

Another advantage of using a mesh cap 36 rather than a solid cap, is that the bond area on the blade can be maximised whilst minimising the overall mass of the cap 36. That is, the cap 36 can extend inwardly from the blade tip 33, across the suction and pressure surface of the blade 30, thereby increasing the bonding area for the cap 36, but without adding excessive weight to the blade 30. The use of wires further enhances the bond area.

In use, the capped blade 30 is positioned opposite the abradable liner 26 of the duct 25, as discussed in connection with FIG. 2. However, because the liner 26 is disposed opposite the cap 36 of the blade 30, rather than the unprotected blade tip 33 of the underlying composite body 31, it is the cap 36 which will come into contact with the liner 26 during a contact or rubbing event. As such, the blade tip 33 itself is protected, reducing the likelihood of damage.

Figure 6:
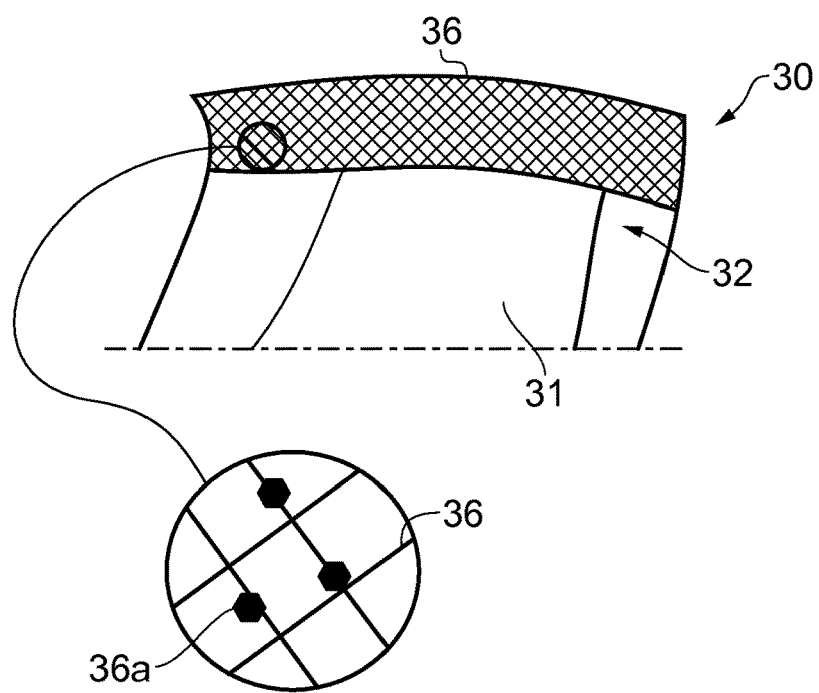
FIG. 6 is a schematic drawing showing a blade tip provided with a mesh cap with a close up of the mesh itself.

In addition, the cap 36 can further comprise an abrasive grit. This can be seen in FIG. 6, which shows a close up of the cap 36, with grit particles 36a provided on the wires of the cap 36. The use of an abrasive grit is advantageous, because it assists the cap 36 with cutting into the liner 26, rather than rubbing along the liner 26, during a contact event. By avoiding a rubbing action, less frictional heating occurs, which in turn means that there is less heat transfer into the composite substrate and adhesive joints of the blade 30, which in turn reduces damage mechanisms such as delamination, for example.

The use of the mesh, particularly a metallic mesh, allows an abrasive grit to be added to the cap 36 in a cost-effective manner. Applying grit directly to the end of a blade 30 with adhesive is less effective, because the glue holding the grit to the blade 30 softens with heat during contact and rubbing events, leading to the grit simply rubbing away from the blade 30. Providing a metal layer or cap under the grit causes other problems. If the metal is titanium, the necessary surface preparation can make it particularly expensive to coat the surface with grit. Using steel makes the blade 30 heavy and stiffer.

In contrast, the grit can be securely attached to a metallic mesh by a relatively simple heat resistant process such as a brazing process, although some materials may require other methods such as electroplating. As such, the grit can be durably attached to the blade 30, via the cap 36, in a way that reduces the ease of grit being rubbed away from the blade 30 during a contact event.

Suitable grits can comprise or consist of but are not limited to, cubic boron nitride, silicon carbide and alumina. Such materials are hard enough to abrade typical fan track liners 26, which are commonly made from polymeric or syntactic foam although metallic constructions of low hardness may be possible.

The size of the grit can be selected to maximise the cutting efficiency of the blade 30 in a particular blade 30/liner 26 system. However, in general, it is preferable for the grit size to be relatively large, e.g. having a mean particle diameter around 200 microns. In some examples the grit has a mean grain size of 50 to 500 microns, optionally 100 to 300 microns, further optionally 150 to 250 microns.

The grit can be added to the mesh before it is formed into the cap 36. The grit can be added to both sides of the mesh or only to one side of the mesh (i.e. the side of the mesh that would face outwards when the mesh is formed into cap 36). Alternatively, the grit could be added to the outside portion of the mesh after it has been formed into cap 36. Providing the grit only on the outer-most portion of the mesh can be advantageous in terms of reducing the weight of the cap 36.

The arrangement of the mesh with respect to the blade 30 can also be advantageous. For example, providing a square or biased mesh such that the lines of the mesh are close to an optimal 45° angle (e.g. from 20° to 70°) to the aerofoil chord of the blade can be advantageous enabling the mesh to drape better over the blade 30. Further, this orientation will allow a certain amount of compliance whilst resisting shear forces. As such, when the mesh becomes loaded in an impact event, the individual lines or wires of the mesh will straighten of detention and help to suppress composite delamination.

The forgoing description is intended only as an example to the skilled person. Variations and modifications are possible within the scope of the claims.

The invention claimed is:

1. A rotary device, comprising:
   a central hub; and
   at least one blade extending from the hub, wherein
   the blade comprises a blade body and a blade cap, the blade body having a blade body tip, the blade cap being arranged to cover the blade body tip,
   the blade cap comprises a mesh,
   the mesh is a metal wire mesh, and
   the mesh only covers the blade body tip such that the blade cap extends across the blade body tip and extends only partly down pressure and suction surfaces of the blade in a region of the tip.

2. A rotary device according to claim 1, wherein the blade cap further comprises an abrasive grit.

3. A rotary device according to claim 2, wherein the abrasive grit is disposed on the mesh.

4. A rotary device according to claim 2, wherein the abrasive grit comprises one or more of cubic boron nitride, silicon carbide and alumina.

5. A rotary device according to claim 2, wherein the abrasive grit has a mean grain size of 50 to 500 microns.

6. A rotary device according to claim 1, wherein the mesh is formed of lines having a diameter of 1.0 mm or less.

7. A rotary device according to claim 1, wherein the mesh has a mesh spacing of 2 mm or less.

8. A rotary device according to claim 1, wherein the mesh is a square mesh or biased, and lines of the mesh are arranged on a surface of the blade body to be at 20° to 70° to an aerofoil chord of the blade.

9. A rotary device according to claim 1, wherein the blade body tip comprises a point on the blade body most radially distant from the hub.

10. A rotary device according to claim 1, wherein the blade body comprises a composite material.

11. An arrangement comprising a rotary device according to claim 1, and a duct arranged around the hub and at least one blade, wherein the duct comprises an abradable liner disposed opposite the blade cap.

12. A gas turbine engine comprising a rotary device according to claim 1.

13. A blade for use in a rotary device, the blade comprising:
   a blade body, having a blade body tip; and
   a blade cap being arranged to cover the blade body tip, wherein
   the blade cap comprises a mesh,
   the mesh is a metal wire mesh, and
   the mesh only covers the blade body tip such that the blade cap extends across the blade body tip and extends only partly down pressure and suction surfaces of the blade in a region of the tip.

14. A method of manufacturing a blade for a rotary device, the method comprising:
   shaping a mesh around a blade body tip to form a blade cap covering the blade body tip, wherein
   the mesh is a metal wire mesh, and
   the mesh only covers the blade body tip such that the blade cap extends across the blade body tip and extends only partly down pressure and suction surfaces of the blade in a region of the tip.

15. A method of manufacturing a blade for a rotary device according to claim 14, further comprising shaping the mesh by cold pressing.

16. A method of manufacturing a blade for a rotary device according to claim 14, further comprising attaching an abrasive grit to the mesh by a heat resistant means such as brazing or electroplating.

17. A method of suppressing delamination of a composite blade for a rotary device, the method comprising:
   providing a mesh around a composite blade body tip to form a blade cap covering the composite blade body tip, wherein the mesh only covers the blade body tip.

18. A rotary device according to claim 1, wherein the mesh is formed of lines having a diameter of 0.5 mm or less.

19. A rotary device according to claim 1, wherein the mesh has a mesh spacing of 1 mm or less.

* * * * *